United States Patent
Dabral et al.

(10) Patent No.: US 7,478,257 B2
(45) Date of Patent: Jan. 13, 2009

(54) LOCAL RECEIVE CLOCK SIGNAL ADJUSTMENT

(75) Inventors: Sanjay Dabral, Palo Alto, CA (US); Richard S. Jensen, Gilbert, AZ (US); Santanu Chaudhuri, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 1410 days.

(21) Appl. No.: 10/403,145

(22) Filed: Mar. 31, 2003

(65) Prior Publication Data

US 2004/0226997 A1 Nov. 18, 2004

(51) Int. Cl.
*G06F 1/00* (2006.01)
(52) U.S. Cl. ...................................... 713/500
(58) Field of Classification Search .................. 713/500
See application file for complete search history.

(56) References Cited

U.S. PATENT DOCUMENTS

| | | | |
|---|---|---|---|
| 4,644,420 A * | 2/1987 | Buchan ....................... 360/51 |
| 4,901,035 A | 2/1990 | Cleveland |
| 5,315,270 A * | 5/1994 | Leonowich .................. 331/1 A |
| 6,531,927 B1 | 3/2003 | Chen |
| 6,977,537 B2 * | 12/2005 | Chaudhuri et al. .......... 327/156 |
| 6,981,168 B2 * | 12/2005 | Schmatz et al. ............. 713/500 |
| 7,158,601 B1 * | 1/2007 | Chew .......................... 375/376 |
| 2003/0128786 A1 * | 7/2003 | Schmatz et al. ............. 375/359 |
| 2003/0149906 A1 * | 8/2003 | Wang .......................... 713/500 |

FOREIGN PATENT DOCUMENTS

| EP | 0 523 886 A1 | 1/1993 |
|---|---|---|
| EP | 0 585 090 A2 | 3/1994 |

OTHER PUBLICATIONS

"PCT International Searching Authority", dated Jul. 27, 2004 for PCTUS2004/005833, 4pgs.

* cited by examiner

*Primary Examiner*—Thomas Lee
*Assistant Examiner*—Mohammed H Rehman
(74) *Attorney, Agent, or Firm*—Buckley, Maschoff & Talwalkar LLC

(57) ABSTRACT

According to some embodiments an apparatus comprising a vote generator, a vote governor, and a local clock controller is provided. The vote generator generates votes based on a local clock signal and transitions in a stream of received data. The vote governor receives the generated votes and discards at least some of the votes. The local clock controller adjusts the local clock signal based on a generated vote that has not been discarded.

14 Claims, 14 Drawing Sheets

LOCAL RECEIVE CLOCK SIGNAL ADJUSTMENT

BACKGROUND

A device may use a local clock signal to facilitate receipt of an information stream, such as a data stream received via a high-speed serial interface. For example, FIG. 1 is a block diagram of a known system 100 in which a transmitter 110 provides a stream of information to a receiver 120. As illustrated in FIG. 1, an original signal 112 may be generated by the transmitter 110 in accordance with a transmit (Tx) clock signal. After the information travels through a channel 130 (e.g., a high-speed serial interface channel), a degraded signal 122 is received by the receiver 120. The receiver 120 may then re-create the original signal 124 in accordance with the received signal 122 and a local receive (Rx) clock signal.

To accurately re-create the original signal, the phases of the local Rx clock signal and the Tx clock signal as seen at the receiver 120 should be aligned as closely as possible. This is typically done by using the received information stream to "recover" information about the Tx clock signal. That is, "transitions" in the received information stream (i.e., from 0 to 1 or from 1 to 0) will reflect transitions in the Tx clock signal. By adjusting the local Rx clock signal in accordance with these transitions, the phase error between the local Rx clock signal and the Tx clock signal may be reduced.

When a received information stream does not contain a sufficient number of transitions (e.g., a data stream of "000000" is received), the receiver 120 may be unable to adjust the local Rx clock signal to track the Tx clock signal (as observed at the receiver 120). One way of avoiding this problem is to use an "8b10b" encoding scheme. In particular, an eight-bit pattern of original data is converted into a ten-bit pattern of data by the transmitter 110 (and the ten-bit pattern may provide at least a minimum transition density). The receiver 120 then converts each ten-bit pattern back into the original eight-bit pattern. The overhead associated with 8b10b encoding, however, reduces the efficiency of the system 100 (e.g., because ten bits must be transmitted to send eight bits of information).

As another approach, FIG. 2 is a block diagram of a known apparatus 200 that adjusts a local Rx clock signal. In particular, an amplifier 210 generates signals (e.g., D, I, and Q signals) based on a received information stream. Note that the amplifier 210 may comprise a number of amplifier units. For example, four amplifier units clocked in different phases may operate in parallel to provide data and information associated with where the data transition edges.

A vote generator, evaluation, and interpolator control unit 220 evaluates these signals and generates indications ("votes") reflecting whether the local Rx clock signal should adjusted backward or forward. That is, a "backward" vote will be generated when received data appears to be transitioning before the local Rx clock signal. Similarly, a "forward" vote will be generated when received data appears to be transitioning after the local Rx clock signal. Based on these votes, digital logic in the unit 220 may provide appropriate control signals to an interpolator 230 to adjust the local Rx clock signal. For example, the interpolator 230 may receive four phases of a clock signal generated by a Phase-Locked Loop (PLL) device 240 in accordance with a core clock signal. The interpolator 230 may then generate and provide clock signals to the amplifier 210 based on information received from the unit 220.

Note the two data streams 250, 260 illustrated in FIG. 2. In the first data stream 250, data transitions frequently after a training period. As a result, the vote generator 220 will generate votes at a high frequency. In contrast, data transitions less frequently in the second data stream 260 (and the vote generator 220 will generate votes at a low frequency). Now consider the graph 300 of FIG. 3, which illustrates local Rx clock signal error as a function of transition density. When the transition density is very low (i.e., there are almost no data transitions), the error is very high because the vote generator 220 does not have sufficient information about the relationship between data transitions and the local Rx clock signal. As the transition density increases, the amount of error present in the local Rx clock signal can be reduced. Above a certain transition density, however, the error in the local Rx clock signal may actually increase. This may be, for example, because of a "loop delay" associated with local Rx clock signal adjustments. Referring again to FIG. 2, the "loop delay" represents an amount of time between receipt of a data transition and an associated adjustment to the local Rx clock signal. When the received data transitions too often, the indications from the vote generator 220 may be inaccurate depending on the loop delay and jitter response characteristics (e.g., the vote generator 220 might think that the local Rx clock signal is transitioning slightly too soon when it is really transitioning much too late). Thus, depending on the loop delay and the transition density associated with a received data stream, the performance of the system 100 might be degraded.

DETAILED DESCRIPTION

Some embodiments described herein are associated with data received via a "channel." As used herein, the term "channel" may refer to, for example, any path through which a stream of information can be received, such as a Peripheral Component Interconnect (PCI) Express channel.

Vote Governor

Figure 4:
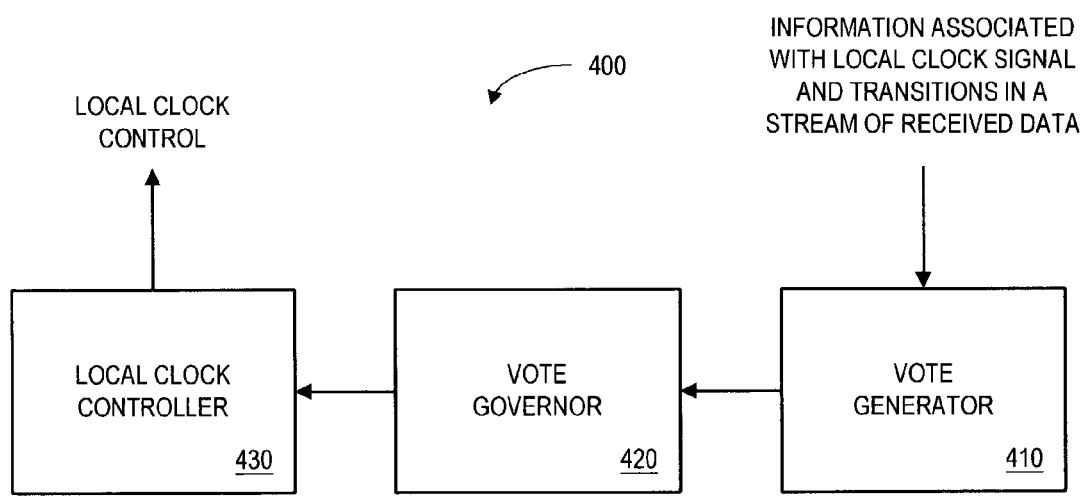
FIG. 4 is a block diagram of an apparatus to adjust a local clock signal according to some embodiments.

FIG. 4 is a block diagram of an apparatus 400 to adjust a local clock signal according to some embodiments. In particular, the apparatus 400 includes a vote generator 410 that receives information associated with a local clock signal (e.g., a local Rx clock signal). The vote generator 410 also receives information about transitions in a stream of received data (e.g., rising and/or falling edges). Based on this information, the vote generator 410 provides votes to a vote governor 420. The votes may represent, for example, whether the local clock signal should be adjusted backward or forward to more closely match the transitions in the stream of received data (and thus a remote Tx clock signal).

The vote governor 420 provides one or more control signals to a local clock controller 430. The local clock controller 430 may then adjust the local clock signal as appropriate.

Figure 5:
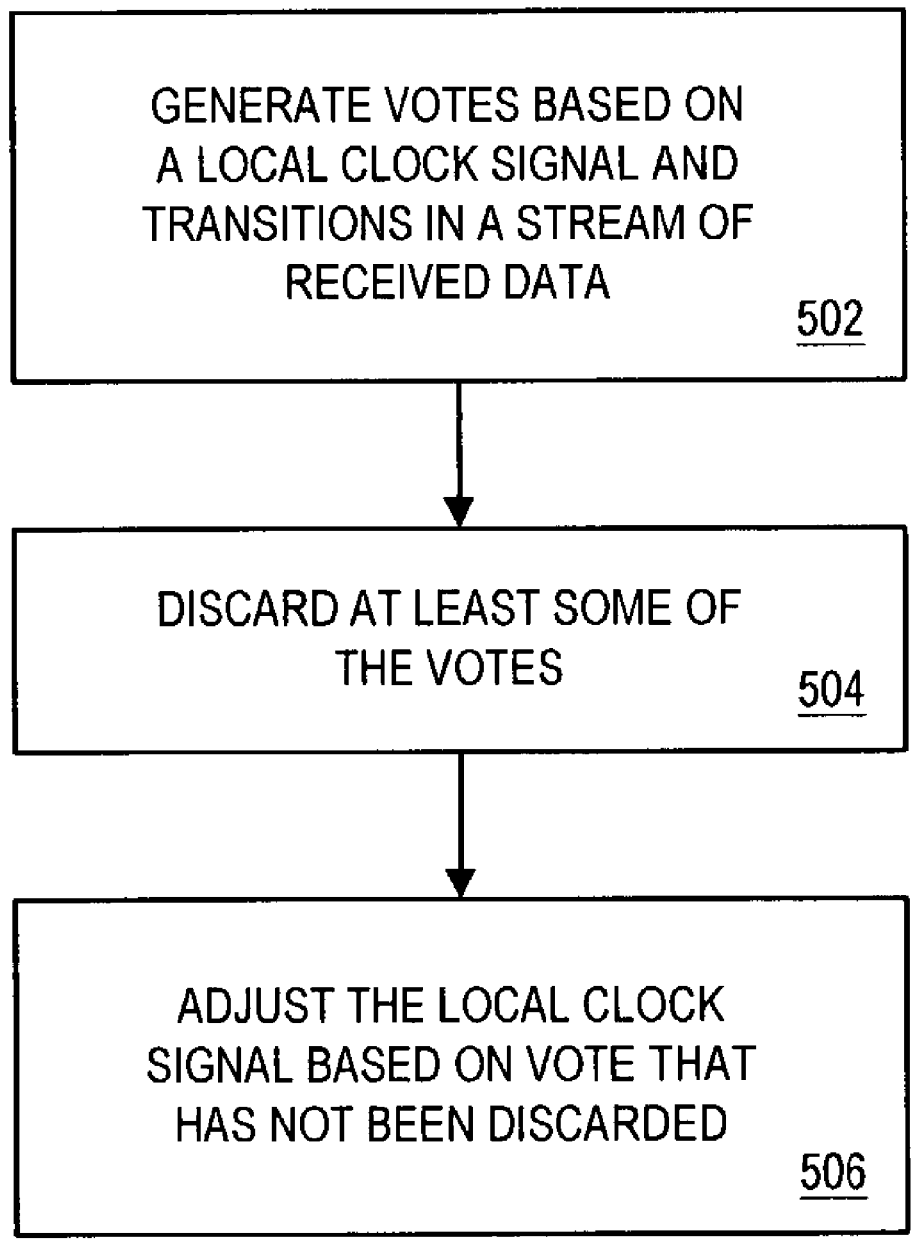
FIG. 5 is a flow chart of a method according to some embodiments.

Refer now to FIG. 5, which is a flow chart of a method according to some embodiments. The flow charts described herein do not necessarily imply a fixed order to the actions, and embodiments may be performed in any order that is practicable. Moreover, any of the methods described herein may be performed by hardware, software (including microcode), or a combination of hardware and software. The method of FIG. 5 may be associated with, for example, the apparatus of FIG. 4.

At 502, vote are generated in accordance with (i) a local clock signal and (ii) transitions in a stream of received data. Note that the phase between the local clock signal (at the receiver latching point) and the transition point of the received data may determine the vote generation. At 504, at least some of these votes are discarded. For example, the vote governor 420 may discard more votes when the stream of received data has a higher transition density as compared to the when the stream of received data has a lower transition density. As another example, the vote governor 420 might discard all votes when the stream of received data is not interpolator training data (and thereby save power).

At 506, the local clock signal is adjusted based on a vote that has not been discarded. For example, the local clock controller 430 may adjust the local clock signal based on control signals received from the vote governor 420 (e.g., the local clock might be moved backward or forward in accordance with votes that have not been discarded by the vote governor 420).

Figure 6:
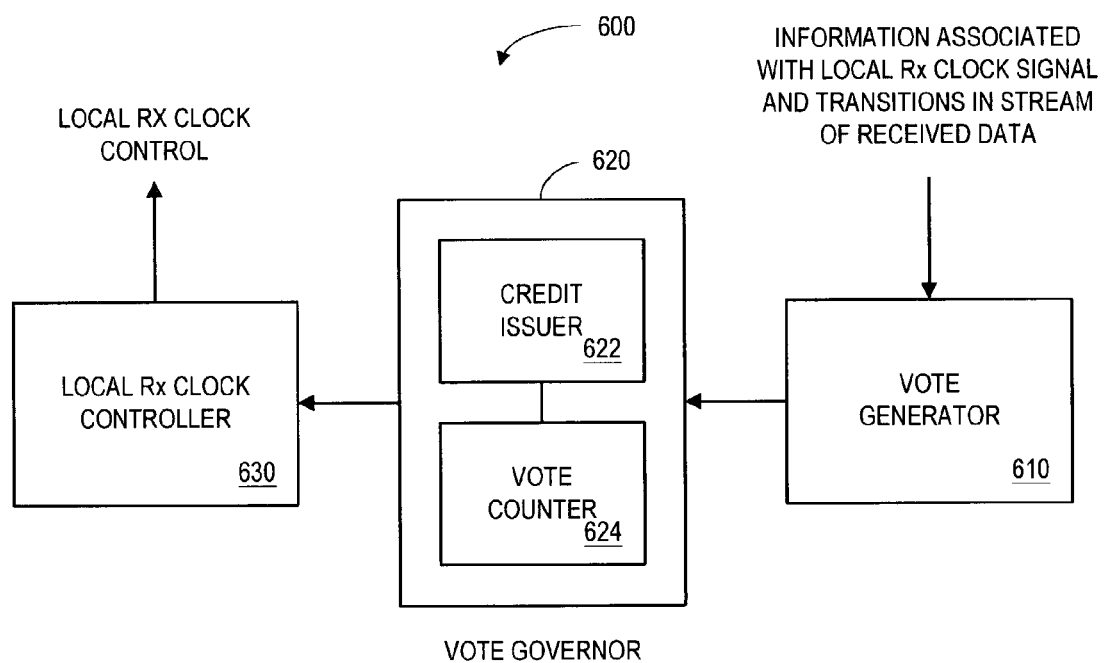
FIG. 6 is a more detailed block diagram of an apparatus to adjust a local Rx clock signal according to some embodiments.

FIG. 6 is a more detailed block diagram of an apparatus 600 to adjust a local Rx clock signal according to some embodiments. The apparatus 600 includes a vote generator 610 that receives information associated with a local Rx clock signal. The vote generator 610 also receives information about transitions in a stream of received data. Based on this information, vote generator 610 provides votes to a vote governor 620. The votes may represent, for example, whether the local tracking Rx clock signal should be adjusted backward or forward to more closely match the transitions in the stream of received data. The vote governor 620 provides one or more control signals to a local Rx clock controller 630. The local Rx clock controller 630 may then adjust the local Rx clock signal as appropriate.

According to this embodiment, the vote governor 620 includes a credit issuer 622 that issues credit at a pre-determined rate as appropriate based on the loop delay and the transition density of the received data. The vote governor 620 also includes a vote counter 624 that receives the votes from the vote generator 610 and provides control signals to the local Rx clock controller 630 based on the available credit. For example, the vote counter 624 might discard one or more votes from the vote generator 610 when insufficient credit is available. When sufficient credit is available, in contrast, the vote counter 624 would provide control signals to the local Rx clock controller 630 (to adjust the local Rx clock signal).

By way of example, the credit issuer 622 might issue one unit of credit every twenty clock cycles. As another example, the credit issuer 622 might issue ½0th of a unit of credit each and every clock cycle. In either case, the vote counter 624 may discard votes received from the vote generator 610 when less than one unit of credit is available. If at least one unit of credit is available, on the other hand, the vote counter 624 might use one or more votes from the vote generator 610 to adjust the local Rx clock signal (e.g., via the local Rx clock controller 630). In this case, the amount of available credit can be reduced (e.g., by one unit). As a result, the vote governor 620 may allow all votes to be counted at lower transition densities while allowing only selective votes to be counted at higher transition densities. Note that such a credit-based system may ensure that votes are not wasted when data transitions are sparse. Also note that there may be a maximum credit threshold. Consider, for example, a situation where votes are not available for a significant period of time, and then a whole cascade of votes occur. If no maximum credit threshold is in place, the interpolator adjustment may be high (i.e., above an optimal point)—thereby degrading performance.

According to some embodiments, the vote governor 620 further includes a vote accumulator (not illustrated in FIG. 6) such that control signals are provided to the local Rx clock controller 630 only when the number of votes equals a pre-determined threshold amount (e.g., only when at least three similar votes have been received from the vote generator 610).

Vote Governor Example

Figure 7:
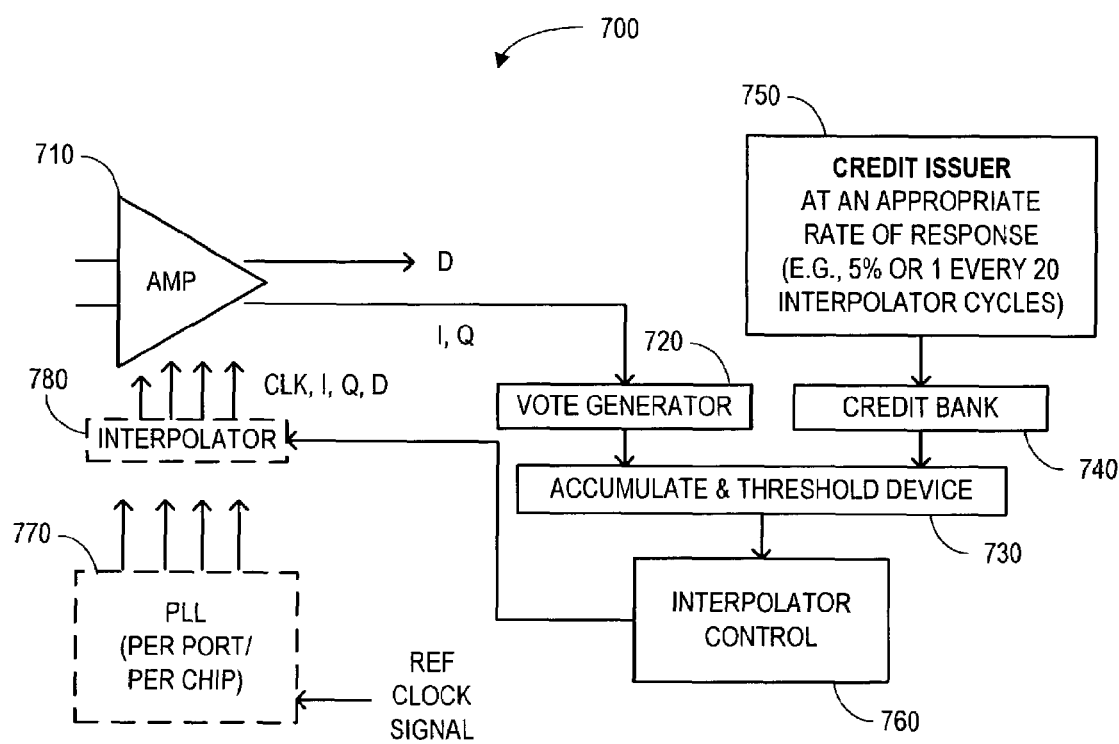
FIG. 7 is a block diagram of a circuit to adjust a local Rx clock signal according to some embodiments.

FIG. 7 is a block diagram of a circuit 700 to adjust a local Rx clock signal according to some embodiments. In particular, an amplifier 710 generates signals (e.g., D, I, and Q signals) based on a received information stream. A vote generator 720 evaluates signals from the amplifier 710 and generates votes to indicate whether the local Rx clock signal should adjusted backward or forward. Note that by sampling the received signal near the center of the eye and near the transitions, the vote generator 720 has information about the instantaneous phase error between the local Rx clock signal phase and the clock embedded in the data transition. That is, a "backward" vote may be generated when received data appears to be transitioning before the local Rx clock signal. Similarly, a "forward" vote may be generated when received data appears to be transitioning after the local Rx clock signal.

An accumulate and threshold device 730 receives votes from the vote generator 720. The accumulate and threshold device 730 may, for example, determine whether or not a pre-determined number of similar votes have a been received from the vote generator 720 (e.g. whether three votes to move the local Rx clock signal forward have been received).

Figure 1:
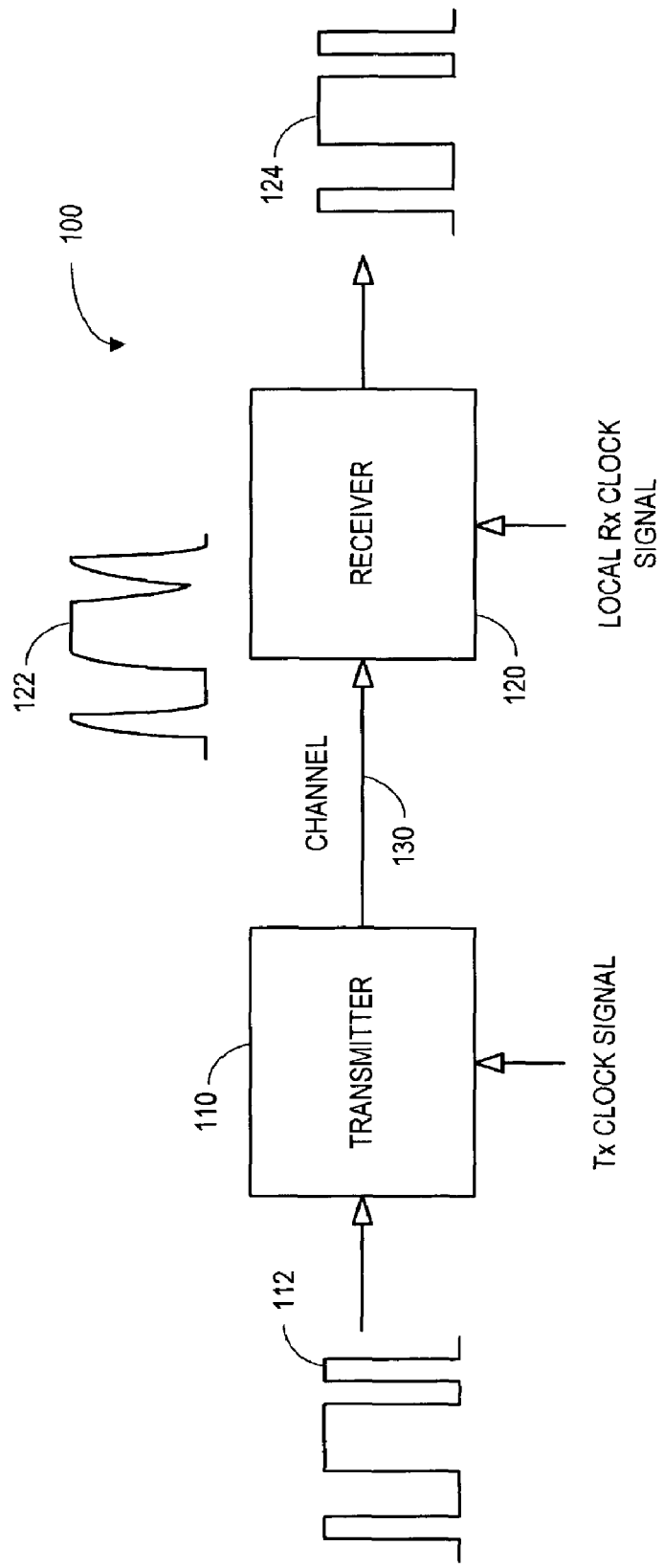
FIG. 1 is a block diagram of a known system.
Figure 2:
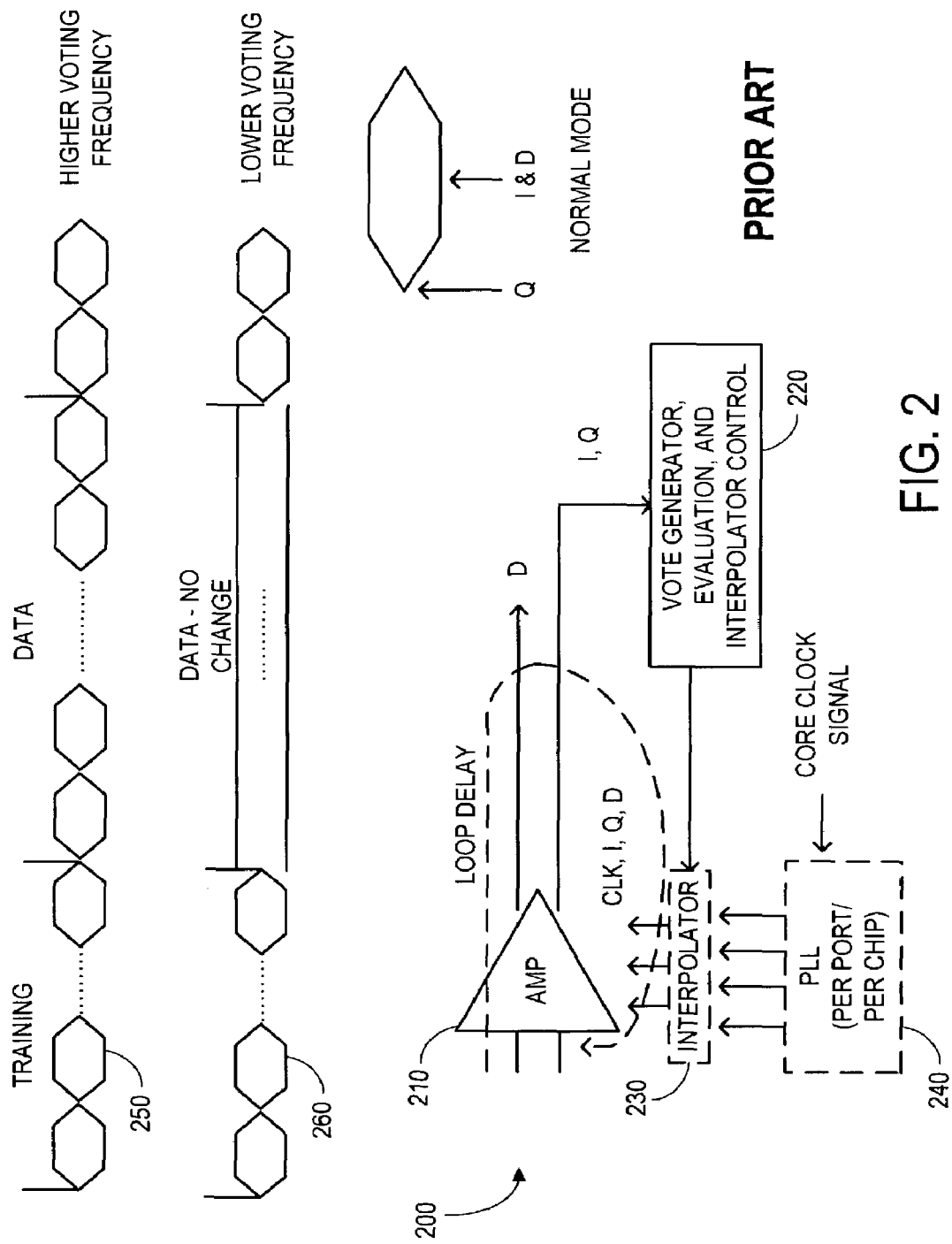
FIG. 2 is a block diagram of a known apparatus to adjust a local Rx clock signal.
Figure 3:
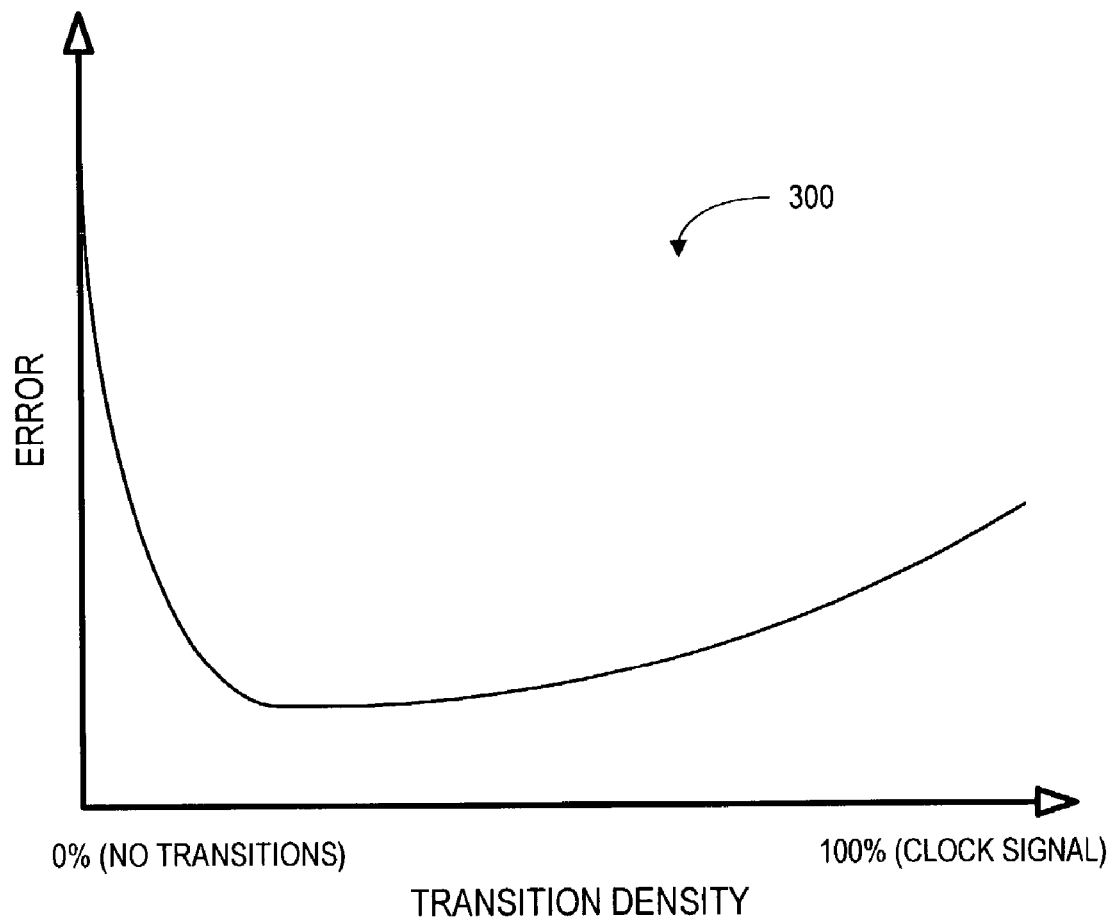
FIG. 3 is a graph illustrating local Rx clock signal error as a function of transition density.

The accumulate and threshold device 730 also has access to credits in a credit bank 740. The credit in the credit bank 740 may be generated, for example, by a credit issuer 750 that stores credits based on an appropriate rate of response (e.g., so that at least some votes are discarded when the transition density is too high as described with respect to FIG. 3). When insufficient credit is available in the credit bank 740, the accumulate and threshold device 730 may discard one or more votes received from the vote generator 720. When sufficient credit is available, on the other hand, the accumulate and threshold device 730 issues control signals to an interpolator 780 via an interpolator control unit 760 (and the amount of available credit in the credit bank 740 is reduced). The interpolator 780 may then generate clock signals for the amplifier 710 as appropriate to adjust the local Rx clock signal.

Figure 8:
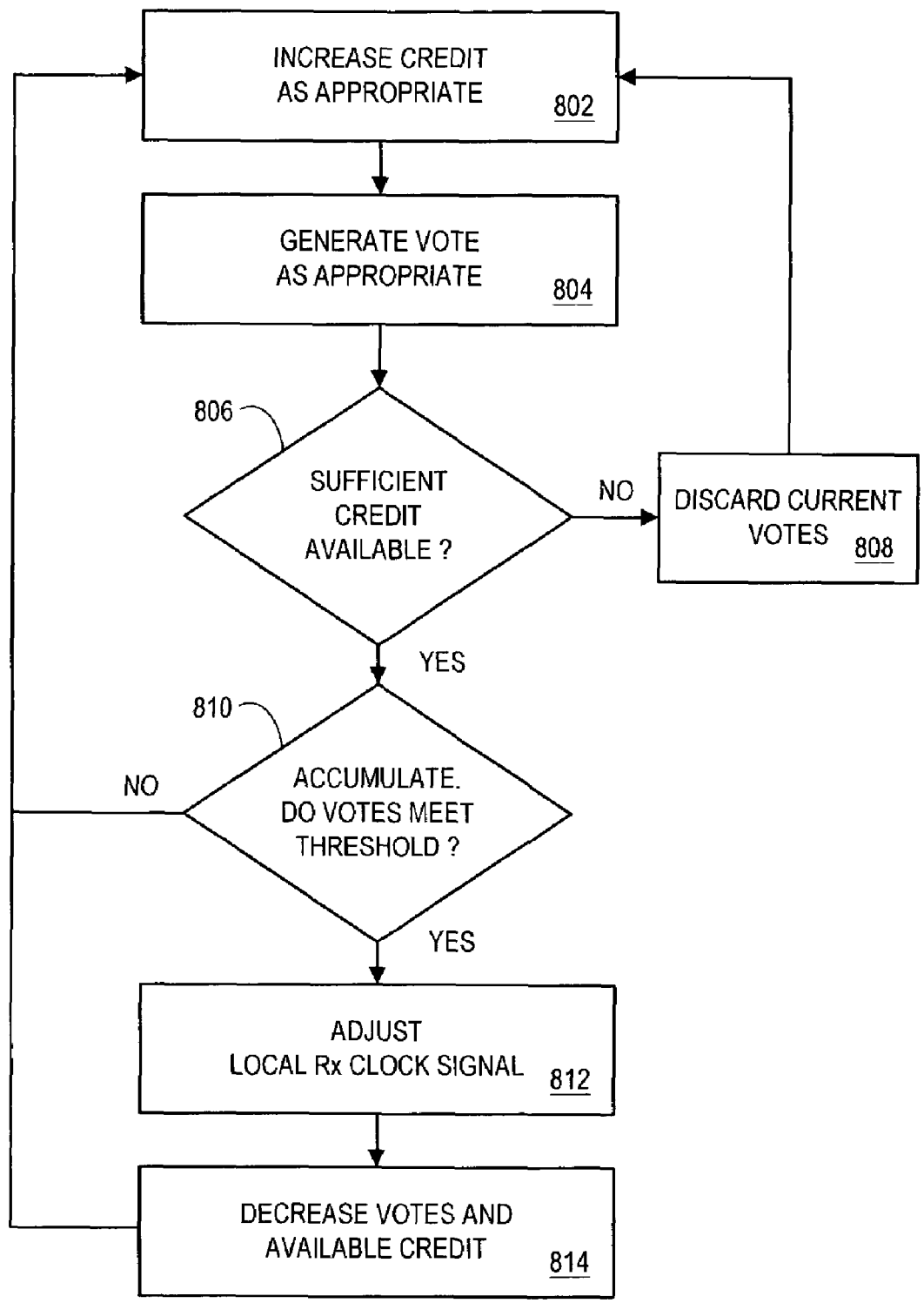
FIG. 8 is a flow chart of a method according to some embodiments.

FIG. 8 is a flow chart of a more detailed method according to some embodiments. The method may be associated with, for example, the circuit described with respect to FIG. 7. At 802, an amount of available credit may be increased if appropriate. For example, the credit issuer 750 may generate and store credit into the credit bank 740 at a pre-determined rate (e.g., once every ten interpolator 780 clock cycles).

At 804, a vote may be generated if appropriate. For example, the vote generator 720 might generate a vote as appropriate based on the local Rx clock and the clock embedded in the received data stream.

If sufficient credit is not available at 806, any current votes are discarded at 808 and the process continues at 802 (e.g., so that additional credit can be accumulated).

If sufficient credit is available, it is determined whether the number of current votes at least equals a pre-determined threshold amount at 810. If not, the process continues at 802 (e.g., so that additional votes can be accumulated).

If the number of current votes at least equals the pre-determined threshold, the local Rx clock signal is adjusted as appropriate at 812 (e.g., by moving the clock signal forward or backward). The amount of available credit is then decreased at 814 (because the credit was applied to the clock signal adjustment), and the process continues at 802.

Thus, more votes will be discarded when the stream of received data has a higher transition density as compared to the when the stream of received data has a lower transition density. In this way, the effective transition density of the received data stream (e.g., the density of transitions that will actually result in clock signal adjustments) may more closely match an optimal density (as described with respect to FIG. 3). Moreover, votes will not be wasted when transition density is sparse (e.g., because of the credit scheme).

Local Receive Clock Signal Adjustment Based on Another Channel

Figure 9:
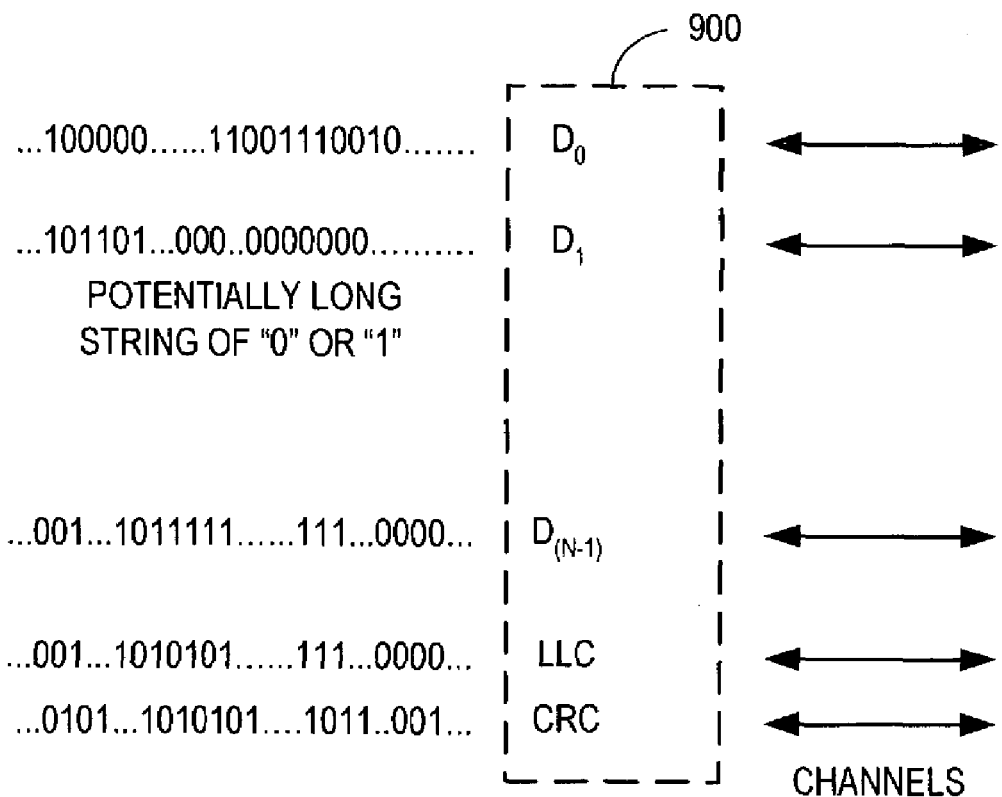
FIG. 9 illustrated streams of received information according to some embodiments.

Some of the embodiments described thus far have addressed a received data stream having a transition density that may be too high. It may be the case, however, that a received data has a transition density that is too low. The resulting lack of information about the embedded clock signal can prevent appropriate adjustments to the local Rx clock signal. For example, FIG. 9 illustrated streams of information received at a port 900 according to some embodiments. In particular, data channels $D_0$ through $D_{(N-1)}$ receive data. Note that one data channel might have a higher transition density as compared to another data channel (e.g., $D_0$ as compared to $D_1$). For example, a data channel associated with an address line for a memory location might have a relatively low transition density.

Figure 10:
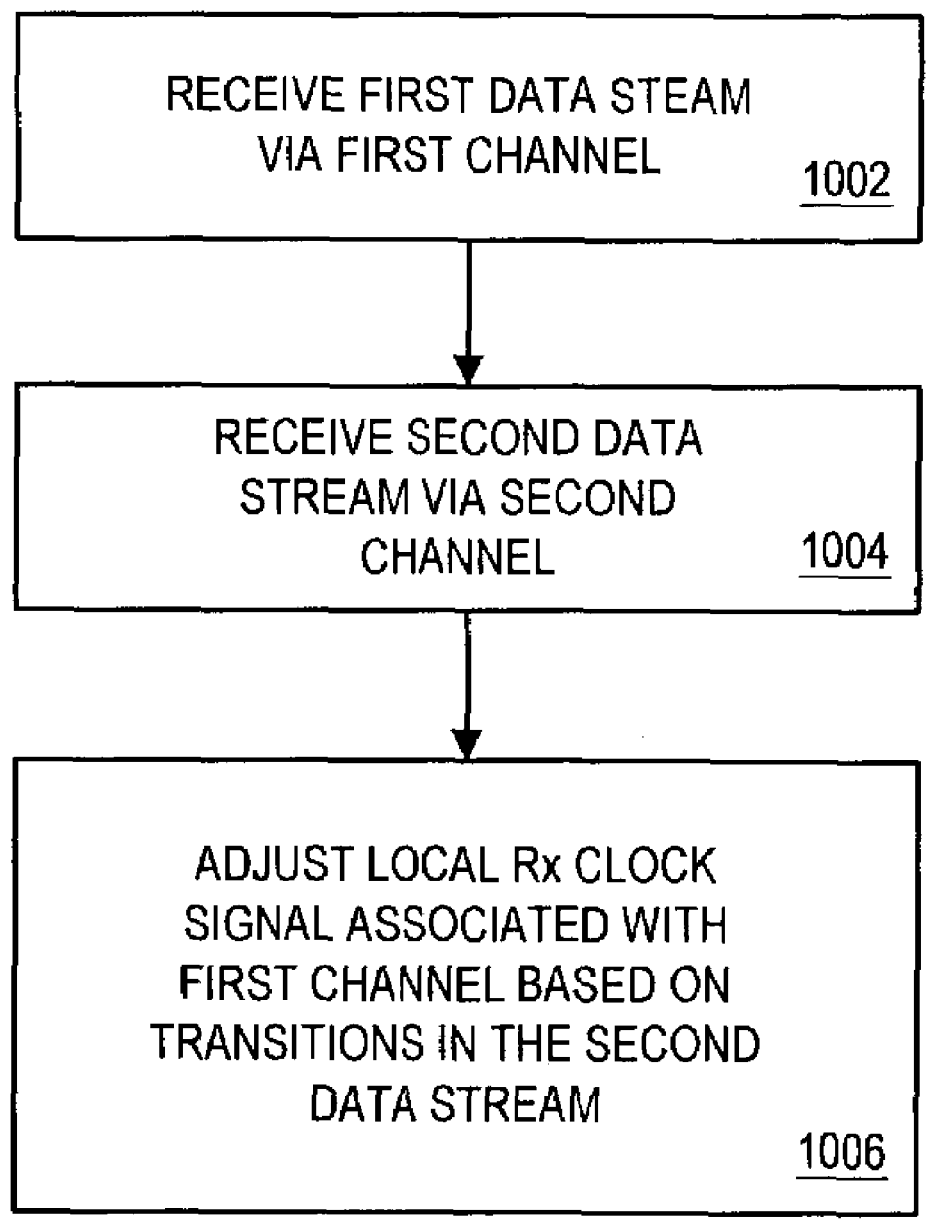
FIG. 10 is a flow chart of a method according to one embodiment.

FIG. 10 is a flow chart of a method addressing this problem according to some embodiments. At 1002, a first data stream is received via a first channel. Similarly, a second data stream is received via a second channel at 1004. Note that a single Tx clock signal has been used to generate both streams of data.

According to this embodiment, a local Rx clock signal associated with the first channel is adjusted based on transitions in the second data stream at 1006. That is, because both data streams may be associated with the same Tx clock signal, information about the clock embedded in one data stream can be used to adjust the Rx clock signal for a different channel (e.g., another channel in the same port). Referring again to FIG. 9, for example, information about the clock embedded in $D_0$ might be used to adjust the local Rx clock signal associated with the channel that receives $D_1$. Note that $D_0$ taken by itself might have a transition density that is sufficient to adjust the local Rx clock signal for the channel that receives $D_1$. It could also be the case, however, that neither $D_0$ nor $D_1$ have a transition density that is sufficient to adjust a local Rx clock signal—but when transitions from both data streams are combined, sufficient information is available.

Figure 11:
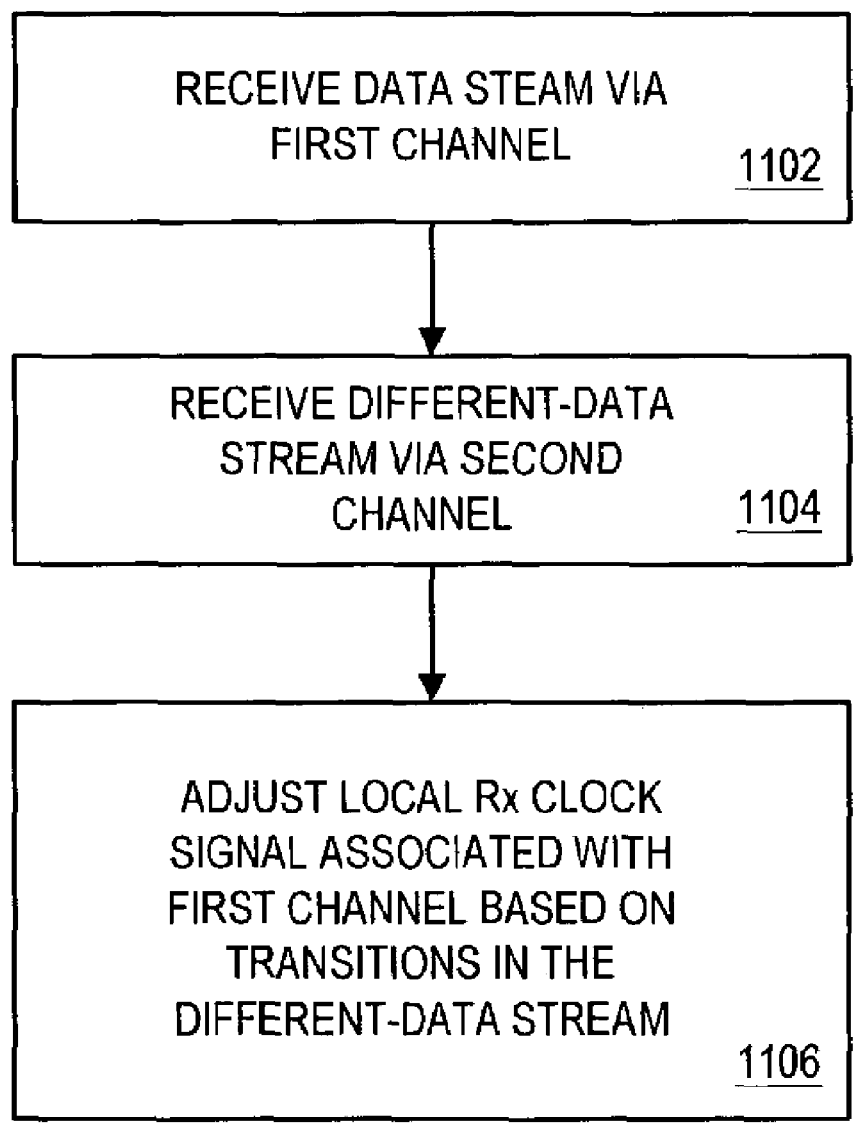
FIG. 11 is a flow chart of a method according to another embodiment.

Thus, a local Rx clock signal associated with one data channel may be updated based on transitions in a stream of information received via another data channel. According to another embodiment, a local Rx clock signal associated with a data channel is instead updated based on transitions in a stream of information received via a "non-data" channel (i.e., a channel that has a primary function other than data transmission). FIG. 11 is a flow chart of a method according to such an embodiment. At 1102, a data stream is received via a first channel. At 1104, a different-data stream is received via a second channel (the second channel may, for example, have a primary function other than data transmission). The different-data stream may be associated with, for example, a Cyclical Redundancy Check (CRC), an Error Correction Code (ECC), or a Link Layer Control (LLC). Note that the nature of the different-data stream may be such that it will intrinsically have a high transition density. At 1106, a local Rx clock signal associated with the first channel is adjusted based on transitions in the different-data stream. For example, transitions in a stream of CRC information might be used to adjust a local Rx clock associated with a data channel.

Figure 12:
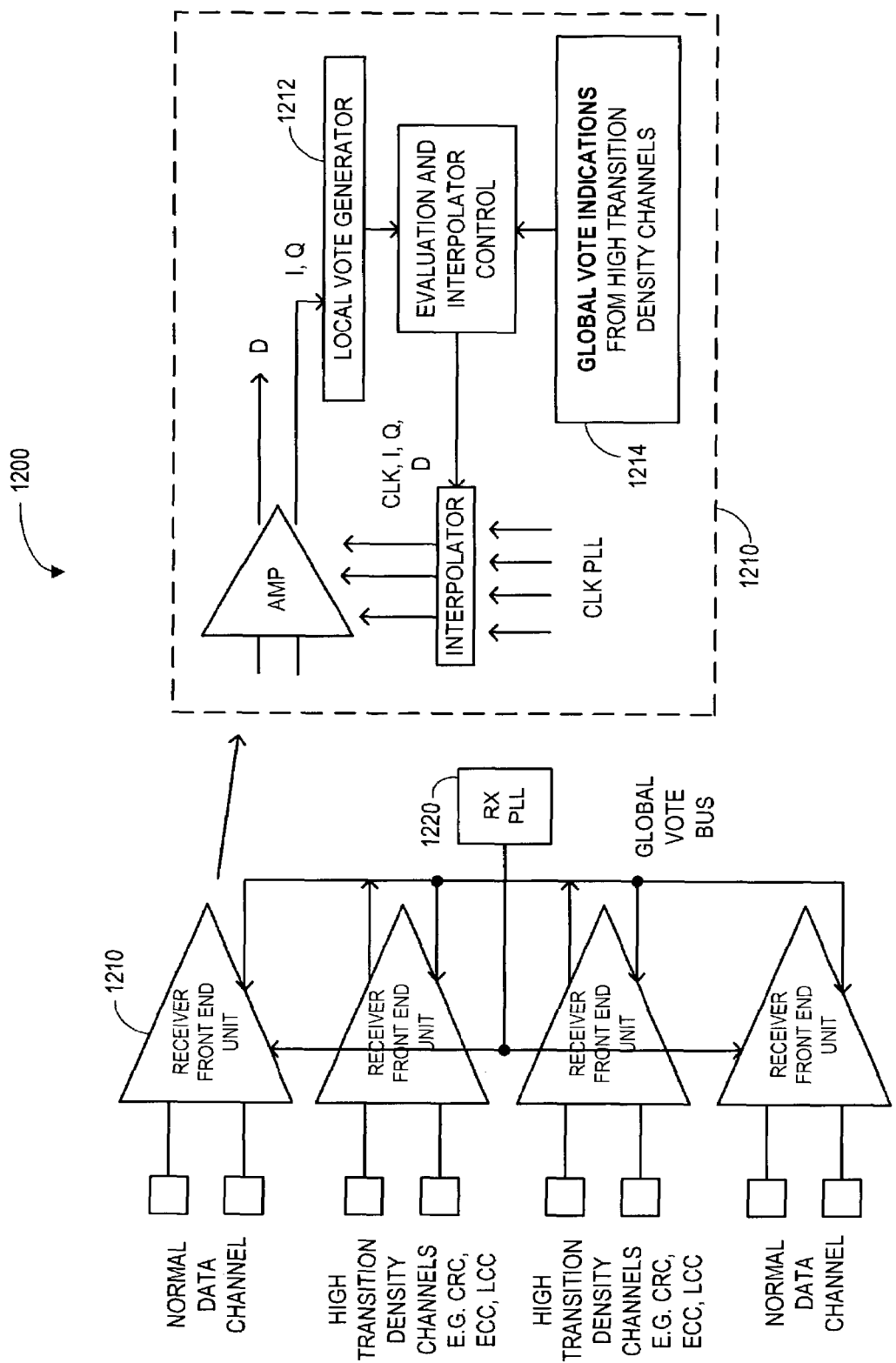
FIG. 12 is a block diagram of a circuit to adjust a local Rx clock signal using global votes according to some embodiments.

FIG. 12 is a block diagram of a circuit 1200 to adjust a local Rx clock signal using global votes according to some embodiments. In particular, two regular data channels and two high transition density, non-data channels are each associated with a receiver front end unit 1210 that receives information from an Rx PLL 1220. Each receiver front end unit 1210 includes a local vote generator 1212 that produces votes based on a comparison between the local Rx clock signal and transitions in the information stream received by that channel. According to this embodiment, a global vote bus takes inputs from the high transition density channel and provides them to all other channels.

That is, each receiver front end unit 1210 also receives global vote indications 1214 generated based on transitions in an information stream received by another channel (e.g., a high transition density, non-data channel). For example, a CRC channel might be used to generate votes that are in turn fed to other channels in the port. These generic votes may then be used by local state machines when votes are not being generated locally. Thus, by "ganging" multiple channels together, a higher transition density may be obtained for all channels to better average and track drift (e.g., lower frequency drifts). Another advantage of adding votes from several channels is that some of the jitter terms can be averaged out. For example, cross-talk (i.e., an exchange of energy between two or more channels that distorts a signal by causing it to arrive early or late) may be averaged and the net jitter due to cross talk within a bundle within a bundle may remain substantially the same.

Figure 13:
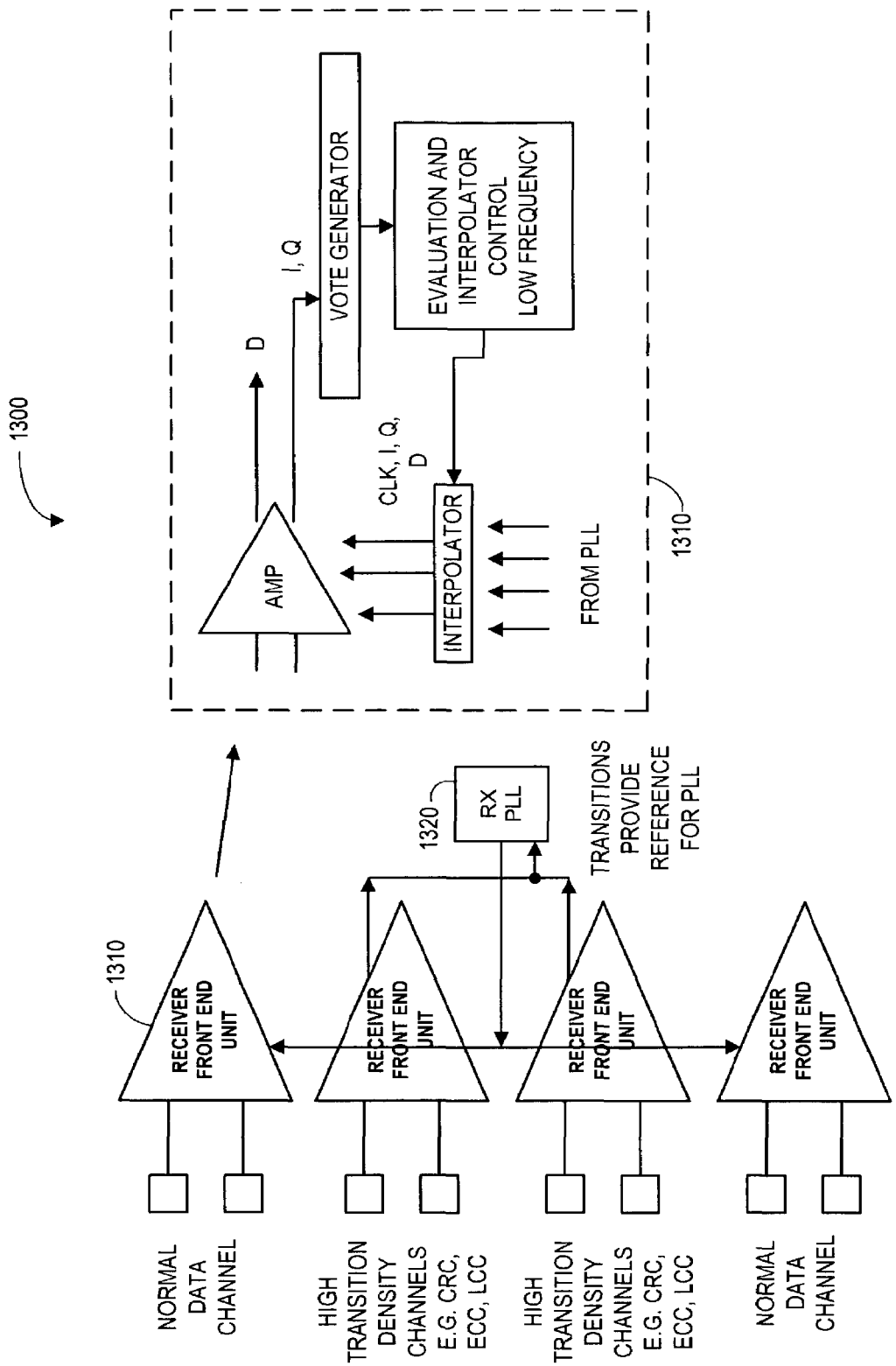
FIG. 13 is a block diagram of a circuit to adjust a local Rx PLL according to some embodiments.

As another approach, FIG. 13 is a block diagram of a circuit 1300 to adjust a local. Rx PLL according to some embodiments. Two normal data channels and two high transition density, non-data channels are each associated with a receiver front end unit 1310 that receives information from an Rx PLL 1320. Each receiver front end unit 1310 includes a vote generator that produces votes based on a comparison between the local Rx clock signal and transitions in the information stream received by that channel. According to this embodiment, transitions associated with the non-data channels are also used as a reference for the Rx PLL 1320. That is, the transitions may provide early or delayed information to which the Rx PLL 1320 can lock (e.g., and then correct the VCO). Although two inputs are shown entering the Rx PLL 1320 in FIG. 13, any number of inputs may be provided. Note that when a linear receiver is used, edges may directly provide the reference edge followed by conventional phase detectors and charge pumps.

System

Figure 14:
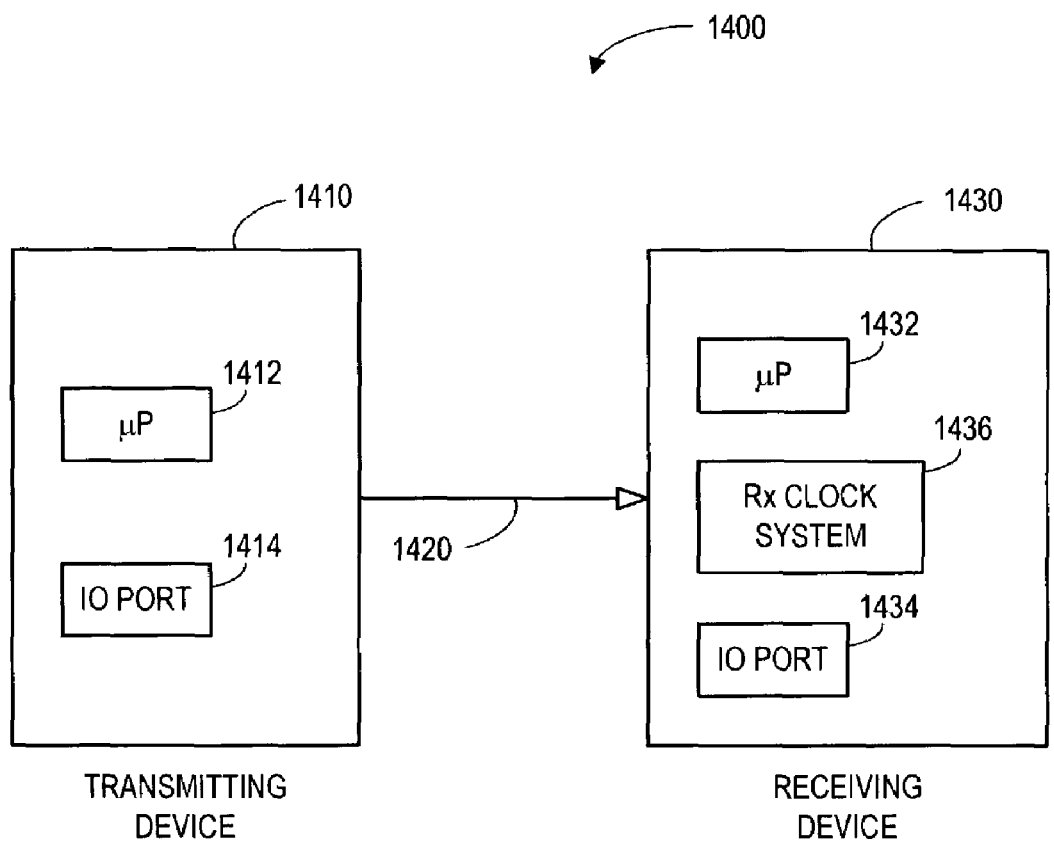
FIG. 14 is a block diagram of a system according to some embodiments.

FIG. 14 is a block diagram of a system 1400 in which a transmitting device 1410 is coupled to a receiving device 1430 via a channel 1420. The transmitting device 1410 includes a microprocessor 1412 that may, for example, execute an application to provide a stream of information to the receiving device 1430 via an Input Output (IO) Port 1414. The receiving device 1430 also includes a microprocessor 1432 that may execute an application to receive the stream of information from the transmitting device 1410 via an Input Output (IO) Port 1434.

The receiving device 1430 also includes an Rx clock system 1436 that operates in accordance with any of the embodiments described herein (e.g., as described with respect to FIGS. 4 through 13). For example, the Rx clock system 1436 may include a vote generator that discards more votes when the stream of data from the transmitting device 1410 has a higher transition density as compared to the when the stream has a lower transition density.

Additional Embodiments

The following illustrates various additional embodiments. These do not constitute a definition of all possible embodiments, and those skilled in the art will understand that many other embodiments are possible. Further, although the following embodiments are briefly described for clarity, those skilled in the art will understand how to make any changes, if necessary, to the above description to accommodate these and other embodiments and applications.

For example, in some embodiments described herein a vote governor discards an indication from a vote generator by completely ignoring the indication. According to another embodiment, the vote governor may instead assign an appropriate weight to the vote. For example, votes that are received when the transition density is low might be weighted more heavily as compared to votes that are received when the transition density is high. As another approach, votes may be suppressed instead of discarded.

Moreover, some embodiments have been described with respect to a credit-based implementation, but other approaches can also be used. For example, a time-based window may be provided such that only one vote that occurs within a particular window can result in a local Rx clock adjustment.

The several embodiments described herein are solely for the purpose of illustration. Persons skilled in the art will recognize from this description other embodiments may be practiced with modifications and alterations limited only by the claims.

What is claimed is:

1. A method, comprising:
generating votes based on a local clock signal and transitions in a stream of received data;
receiving the generated votes at a vote governor;
discarding at least some of the generated votes;
adjusting the local clock signal based on a generated vote that has not been discarded,
wherein more votes are discarded when the stream of received data has a higher transition density as compared to the when the stream of received data has a lower transition density;
issuing credit at a pre-determined rate;
discarding a vote when insufficient credit is available; and
adjusting the local clock signal when sufficient credit is available.

2. The method of claim 1, wherein the local clock signal is a receive clock signal and the votes indicate whether the receive clock signal should be adjusted backward or forward.

3. The method of claim 1, further comprising:
reducing credit when the local clock signal is adjusted.

4. The method of claim 1, wherein said discarding comprises:
discarding votes when the stream of received data is not training data.

5. An apparatus, comprising:
a first channel to receive a first stream of information;
a second channel to receive a second stream of information;
a vote governor to receive the first stream of information and the second stream of information and to discard at least some of the first stream of information or the second stream of information; and
a local clock controller to adjust a local receive clock signal associated with the first channel based on transitions in the second stream of information wherein the vote governor is to issue credit at a pre-determined rate, discard a vote when insufficient credit is available, and adjust a local clock signal when sufficient clock is available.

6. The apparatus of claim 5, wherein the first and second channels are data channels.

7. The apparatus of claim 5, wherein the first channel is a data channel and the second channel has a primary function other than data transmission.

8. The apparatus of claim 7, wherein the second channel is associated with at least one of: (i) a cyclical redundancy check, (ii) an error correction code, and (iii) a link layer control.

9. The apparatus of claim 5, wherein the local clock controller is further to adjust the local receive clock signal based on transitions in the first stream of information.

10. A method, comprising:
receiving a first stream of information via a first channel;
receiving a second stream of information via a second channel;
receiving the first stream of information and the second stream of information at a vote governor wherein the vote governor is to discard at least some of the first stream of information or the second stream of information;
adjusting a local receive clock signal associated with the first channel in based on transitions in the second stream of information;
issuing credit at a pre-determined rate;
discarding a vote when insufficient credit is available; and
adjusting the local clock signal when sufficient credit is available.

11. The method of claim 10, wherein the first and second channels are data channels.

12. The method of claim 10, wherein the first channel is a data channel and the second channel has a primary function other than data transmission.

13. The method of claim 10, wherein the second channel is associated with at least one of: (i) a cyclical redundancy check, (ii) an error correction code, and (iii) a link layer control.

14. The method of claim 10, wherein the local receive clock signal is further adjusted based on transitions in the first stream of information.

* * * * *